Goodrich & Edwards,
Reciprocating Steam Engine,
N° 56,404. Patented July 17, 1866.
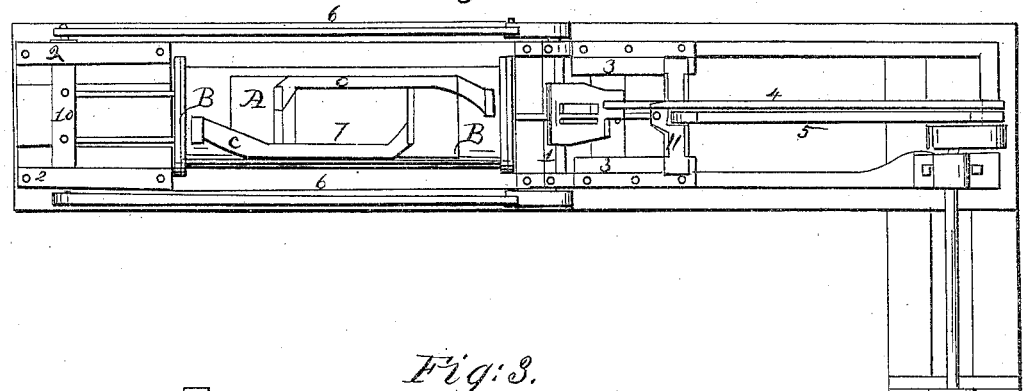
Fig: 1.
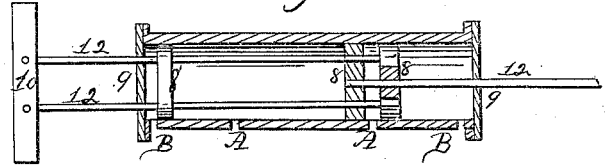
Fig: 3.
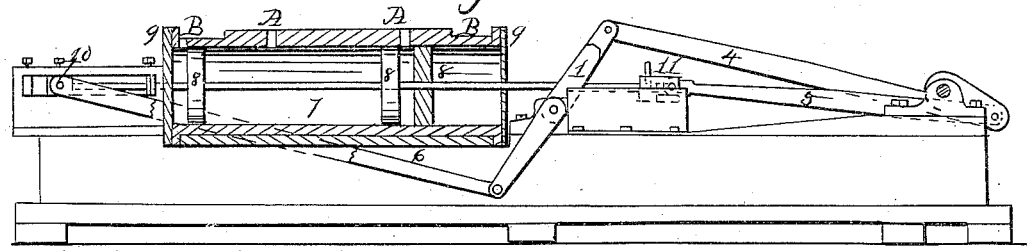
Fig: 2.
Witnesses.
T. C. Smith
J. B. Hines
Inventor.
Hanson Goodrich
G. K. Edwards

UNITED STATES PATENT OFFICE.

H. GOODRICH AND G. R. EDWARDS, OF SHAWNEETOWN, ILLINOIS.

IMPROVEMENT IN STEAM-ENGINES.

Specification forming part of Letters Patent No. 56,404, dated July 17, 1866.

*To all whom it may concern:*

Be it known that we, HANSON GOODRICH and GEO. R. EDWARDS, of Shawneetown, in the county of Gallatin and State of Illinois, have invented a new and useful Improvement in Steam-Engines; and we do hereby declare that the following is a full, clear, and exact description of the same, reference being had to the annexed drawings, making a part of this specification, in which—

Figure 1 is a top perspective view; Fig. 2, view of right side; Fig. 3, cylinder in section, showing pistons and piston-heads.

1 represents rock-shaft arm; 2 2, slides in rear of cylinder; 3 3, slides in front of cylinder; 4, pitman from top of rock-shaft arm to crank; 5, pitman from T-head in front to crank; 6, pitmen from T-heads in rear to lower end of rock-shaft arm; 7, cylinder showing ports at each end, and also at one-third the length of cylinder from the ends; 8 8 8, piston-heads, (three in number;) 9 9, cylinder-heads, (two in number;) 10, T-head in rear of cylinder; 11, T-head in front of cylinder; 12, piston-rods, (three in number.)

By applying the power from the rear of the cylinder through the rock-shaft we greatly add power to the crank, said rock-shaft acting as a lever. Ports A A and B B are connected by tubes $c$ $c$, so as to admit the steam at ports A and B simultaneously, thus exposing to the pressure of the steam double the surface of the cylinder-head at one and the same time. Further, by means of pitman 4 from top of rock-shaft, we secure a rotary motion, overcoming the stopping on the center, as pitman 5 from front T-head carries the crank up on a level with the center. Pitman 4 receives and continues the motion by pulling the crank over past the center.

What we claim as new, and desire to secure by Letters Patent, is—

The combination and arrangement of the movable piston-heads 8 8 8 with the piston-rods 12 12 12, ports A A and B B, with the tubes $c$ $c$, pitmen 4, 5, and 6, and rock-shaft arm 1, substantially in the manner and upon the principle as herein set forth.

HANSON GOODRICH.
G. R. EDWARDS.

Witnesses:
D. E. ROSENBAUM,
SILAS RHOADES.